US011475446B2

(12) United States Patent
Gurunathan et al.

(10) Patent No.: US 11,475,446 B2
(45) Date of Patent: Oct. 18, 2022

(54) SYSTEM, METHODS AND COMPUTER PROGRAM PRODUCTS FOR IDENTITY AUTHENTICATION FOR ELECTRONIC PAYMENT TRANSACTIONS

(71) Applicant: MASTERCARD INTERNATIONAL INCORPORATED, Purchase, NY (US)

(72) Inventors: Arunmurthy Gurunathan, Pune (IN); Ravi Pareek, Pune (IN)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 20 days.

(21) Appl. No.: 16/668,687

(22) Filed: Oct. 30, 2019

(65) Prior Publication Data

US 2020/0211009 A1 Jul. 2, 2020

(30) Foreign Application Priority Data

Dec. 28, 2018 (IN) .............................. 201811049652

(51) Int. Cl.
*G06Q 20/34* (2012.01)
*G06Q 20/40* (2012.01)
(Continued)

(52) U.S. Cl.
CPC ............. *G06Q 20/40* (2013.01); *G06Q 20/10* (2013.01); *G06Q 20/12* (2013.01); *G06Q 20/20* (2013.01);
(Continued)

(58) Field of Classification Search
CPC ........ G06Q 20/12; G06Q 20/20; G06Q 40/00; G06Q 20/40; G06Q 20/10; G06Q 20/385;
(Continued)

(56) References Cited

U.S. PATENT DOCUMENTS 5,812,668 A 9/1998 Weber
5,850,446 A 12/1998 Berger et al.
(Continued)

FOREIGN PATENT DOCUMENTS

EP 2947615 A1 11/2015
WO WO2010/078522 7/2010
(Continued)

OTHER PUBLICATIONS

Dialog Search Report, dated May 3, 2022. (Year: 2022).*
(Continued)

*Primary Examiner* — Hai Tran
(74) *Attorney, Agent, or Firm* — Harness, Dickey & Pierce, P.L.C.

(57) ABSTRACT

The disclosure comprises systems, methods and computer program products for identity authentication in connection with payment account information submitted for the purpose of network based electronic payment transaction(s). The disclosure comprises (i) receiving from a merchant server, (a) a name associated with a purchaser, and (b) a payment card number, (ii) retrieving a data record comprising a payment card holder name associated with the received payment card number, (iii) comparing the payment card holder name extracted from the retrieved data record with the name associated with the purchaser that has been received at the merchant server, and (d) responsive to a match between the payment card holder name extracted from the retrieved data record with the name associated with the purchaser that has been received at the merchant server, generating a positive identity authentication decision and transmit said identity authentication decision to the merchant server.

6 Claims, 12 Drawing Sheets

(51) Int. Cl.
  *G06Q 20/12* (2012.01)
  *G06Q 20/38* (2012.01)
  *G06Q 40/00* (2012.01)
  *G06Q 20/20* (2012.01)
  *G06Q 20/10* (2012.01)

(52) U.S. Cl.
  CPC ......... *G06Q 20/382* (2013.01); *G06Q 20/385* (2013.01); *G06Q 40/00* (2013.01)

(58) Field of Classification Search
  CPC ... G06Q 20/4014; G06Q 20/382; G06Q 20/34
  USPC ...................................... 705/35–45; 235/375
  See application file for complete search history.

(56) References Cited

U.S. PATENT DOCUMENTS

| | | | |
|---|---|---|---|
| 5,889,863 | A | 3/1999 | Weber |
| 5,931,917 | A | 8/1999 | Nguyen et al. |
| 5,943,424 | A | 8/1999 | Berger et al. |
| 5,978,840 | A | 11/1999 | Nguyen et al. |
| 5,983,208 | A | 11/1999 | Haller et al. |
| 5,987,132 | A | 11/1999 | Rowney |
| 5,987,140 | A | 11/1999 | Rowney et al. |
| 5,996,076 | A | 11/1999 | Rowney et al. |
| 6,002,767 | A | 12/1999 | Kramer |
| 6,021,399 | A | 2/2000 | Demers et al. |
| 6,026,379 | A | 2/2000 | Haller et al. |
| 6,119,105 | A | 9/2000 | Williams |
| 6,178,409 | B1 | 1/2001 | Weber et al. |
| 6,253,027 | B1 | 6/2001 | Weber et al. |
| 6,324,525 | B1 | 11/2001 | Kramer et al. |
| 6,373,950 | B1 | 4/2002 | Rowney |
| 6,488,206 | B1 * | 12/2002 | Flaig ................... G06Q 20/341 235/375 |
| 6,944,669 | B1 | 9/2005 | Saccocio |
| 7,249,093 | B1 | 7/2007 | King |
| 7,623,686 | B2 | 11/2009 | Kondo et al. |
| 8,635,327 | B1 | 1/2014 | Levergood et al. |
| 8,943,580 | B2 | 1/2015 | Fadell et al. |
| 9,917,827 | B2 | 3/2018 | Levergood et al. |
| 10,290,000 | B2 | 5/2019 | Kenderov |
| 10,592,718 | B2 | 3/2020 | Khuri-Yakub et al. |
| 10,866,699 | B1 | 12/2020 | Hassan et al. |
| 11,095,439 | B1 | 8/2021 | Vakili |
| 2001/0027439 | A1 | 10/2001 | Holtzman et al. |
| 2002/0052948 | A1 | 5/2002 | Baudu et al. |
| 2003/0051138 | A1 | 3/2003 | Maeda et al. |
| 2003/0140007 | A1 | 7/2003 | Kramer et al. |
| 2008/0027809 | A1 | 1/2008 | Storm |
| 2008/0097925 | A1 | 4/2008 | King |
| 2008/0117451 | A1 | 5/2008 | Wang |
| 2008/0288363 | A1 | 11/2008 | Ueno et al. |
| 2009/0210347 | A1 | 8/2009 | Sarcanin |
| 2010/0322404 | A1 | 12/2010 | Coleman et al. |
| 2011/0022481 | A1 | 1/2011 | Horvath et al. |
| 2011/0228989 | A1 | 9/2011 | Burton |
| 2011/0276484 | A1 * | 11/2011 | Pearson ................. G06Q 20/40 705/44 |
| 2012/0282893 | A1 | 11/2012 | Kim et al. |
| 2013/0024915 | A1 | 1/2013 | Jones et al. |
| 2013/0024916 | A1 | 1/2013 | Evans |
| 2013/0297513 | A1 | 11/2013 | Kirillin et al. |
| 2014/0081854 | A1 | 3/2014 | Sanchez et al. |
| 2015/0086756 | A1 | 3/2015 | Dubey |
| 2015/0088756 | A1 | 3/2015 | Makhotin et al. |
| 2016/0148201 | A1 * | 5/2016 | Kadaster ............. G06Q 20/425 705/44 |
| 2017/0012949 | A1 | 1/2017 | Boren et al. |
| 2017/0017957 | A1 | 1/2017 | Radu |
| 2018/0150832 | A1 | 5/2018 | Badal-Badalian et al. |
| 2018/0253727 | A1 | 9/2018 | Ortiz et al. |
| 2018/0293573 | A1 | 10/2018 | Ortiz et al. |
| 2019/0123899 | A1 | 4/2019 | Rutherford et al. |
| 2019/0139024 | A1 * | 5/2019 | Bakshi ................. H04W 12/06 |
| 2020/0143377 | A1 * | 5/2020 | Lam ....................... G06F 21/32 |
| 2020/0226601 | A1 | 7/2020 | Gurunathan et al. |

FOREIGN PATENT DOCUMENTS

| | | |
|---|---|---|
| WO | WO2017/101995 | 6/2017 |
| WO | WO2018/141047 | 8/2018 |

OTHER PUBLICATIONS

Google Scholar Search, dated May 3, 2022. (Year: 2022).*
Google Patent, dated May 3, 2022. (Year: 2022).*
Soonhwa Sung, Cheong Youn, Eunbae Kong and Jaecheol Ryou, "User authentication using mobile phones for mobile payment," 2015 International Conference on Information Networking (ICOIN), Cambodia, 2015, pp. 51-56, (User Authentication). (Year: 2015).
Office Action dated Feb. 17, 2022. U.S. Appl. No. 16/732,889 has common subject matter as the instant application, the same inventors and the same Applicant, Mastercard International Incorporated.
P. Urien, M. Pasquet and C. Kiennert, "A breakthrough for prepaid payment: End to end token exchange and management using secure SSL channels created by EAP-TLS smart cards," 2011 International Conference on Collaboration Technologies and Systems (CTS), 2011, pp. 476-483 (End to End) (Year: 2011).
U.S. Appl. No. 16/732,889, filed Jan. 2, 2020, Gurunathan et al.
Examination Report issued in Indian Patent Application No. 201911001234 dated Feb. 25, 2021. IN201911001234 has common subject matter as the instant application, the same inventors and the same Applicant, Mastercard International Incorporated.

* cited by examiner

SYSTEM, METHODS AND COMPUTER PROGRAM PRODUCTS FOR IDENTITY AUTHENTICATION FOR ELECTRONIC PAYMENT TRANSACTIONS

CROSS-REFERENCE TO RELATED APPLICATION

This application claims the benefit of, and priority to, Indian Patent Application No. 201811049652 filed on Dec. 28, 2018. The entire disclosure of the above application is incorporated herein by reference.

FIELD

The present disclosure relates to the field of electronic payment transactions, and more specifically to systems, methods and computer program products for preventing unauthorized use of a payment card for online transactions.

BACKGROUND

This section provides background information related to the present disclosure which is not necessarily prior art.

Electronic transactions and payments using payment cards or electronic payment accounts are increasingly common—with the number of electronic payment transactions and ubiquity of electronic transaction mechanisms and services growing steadily.

The use of electronic payment transactions for effecting payment for goods or services through websites or network communication based software applications is particularly ubiquitous, but has been found to present certain security challenges.

FIG. 1 illustrates a prior art system environment 100 that is configurable to implement prior art methods of identity authentication. Client terminal 102 may comprise any network communication enabled data processing terminal through which a user accesses an online website, a software application or payment gateway through which payment is intended to be made to a merchant for products or services. Said client terminal 102 may be communicably coupled with merchant server 106 through communication network 104, and merchant server 106 may be configured to either receive a payor's payment card information or payment account information for the purposes of initiating a payment from the payor's payment card or payment account to a merchant payment account.

The initiation of payment from the payor's payment card or payment account to a merchant payment account is routinely made subject to at least one prior factor authentication of the identity of the individual requesting initiation of the payment, to ensure that such individual is in fact the authorized holder or user of the payment card or payment account. Typically, however, existing systems for identity authentication are limited to requiring input of a static passcode or a password or a personal identification number. In some embodiments, prior art authentication systems also require second factor authentication, which authentication may involve the merchant server 106 communicating with an issuer network 108 (i.e., a network corresponding to a financial institution that has issued the payor's payment card or payment account), intimating issuer network 108 that a payment transaction based on the presented payment card or payment account has been initiated and requesting issuer network 108 to commence a second factor authentication process flow.

Issuer network 108 responds to a request for second factor authentication from merchant server 106 by generating a dynamic password or a one-time-password (OTP) associated with the payment card or payment account and forwarding the OTP to a registered device 110 (for example, a registered mobile device) that has been associated in the records of the issuer network 108 with the authorized holder of the payment card or payment account. Assuming the payment card or payment account has been presented by the authorized holder thereof, at merchant server 106, for initiating payment, said authorized holder may look up the received OTP on her/his registered device 110 and input the received OTP at client terminal 102 for onward communication through communication network 104 and merchant server 106 to issuer network 108.

Issuer network 108 compares the OTP received from client terminal 102 with the OTP forwarded to registered device 110 and in case of a match authenticates the identity of the individual/entity who has requested initiation of the payment transaction. Responsive to successful identity authentication, issuer network completes the requested electronic transfer of funds from the payor's payment card or payment account to the merchant account.

Despite implementation of both primary and second factor authentication, prior art systems have been found to be susceptible to misuse by malicious third parties, both in terms of misappropriation of payment card/payment account numbers and associated static passwords or static personal identification numbers (for example, through shoulder surfing or social engineering techniques) as well as in terms of misappropriation of OTPs sent to a registered mobile device (for example, by ensuring unauthorized access to data within an authorized holder's registered mobile device).

There is accordingly a requirement for a solution that enables convenient and secure multi-factor authentication of an identity of an individual or entity seeking to use a payment card or payment account to effect an electronic payment transaction.

SUMMARY

This section provides a general summary of the disclosure, and is not a comprehensive disclosure of its full scope or all of its features. Aspects and embodiments of the disclosure are set out in the accompanying claims.

The present disclosure relates to the field of electronic payment transactions, and specifically to systems, methods and computer program products for preventing unauthorized use of a payment card for online transactions.

In an embodiment, the disclosure comprises a method for identity authentication in connection with payment account information submitted for the purpose of network based electronic payment transaction(s). The method comprises, at a trusted intermediary server, (i) receiving from a merchant server, (a) a name associated with a purchaser identified for the purpose of the network based electronic payment transaction(s), and (b) a payment card number corresponding to a payment card presented for the purpose of implementing the network based electronic payment transaction(s), (ii) retrieving a data record comprising a payment card holder name associated with the received payment card number, (iii) comparing the payment card holder name extracted from the retrieved data record with the name associated with the purchaser that has been received at the merchant server, and (iv) responsive to a match between the payment card holder name extracted from the retrieved data record with the name associated with the purchaser that has been received at the merchant server, generating a positive identity authentication decision and transmit said identity authentication decision to the merchant server.

In an embodiment of the method, the merchant server is configured to respond to receiving the positive identity authentication decision from the trusted intermediary server by authorizing electronic payment transaction(s) based on the payment card number.

The step of retrieving a data record comprising a payment card holder name associated with the received payment card number may include (i) identifying an issuer server associated with an issuer institution that has issued the payment card to which the received payment card number corresponds, (ii) transmitting to the identified issuer server, the received payment card number, and (iii) receiving from the identified issuer server, a data record comprising a name of the authorized holder of the payment card to which the received payment card number corresponds.

In one method embodiment, the step of retrieving a data record comprising a payment card holder name associated with the received payment card number includes (i) retrieving from a database configured to map payment card numbers with unique registrant IDs, a unique registrant ID associated with the received payment card number, wherein each unique registrant ID within the database correlates to a corresponding identity data record associated within an identity verification server, said corresponding identity data record including at least an entity name associated with said identity data record, (ii) transmitting to the identity verification server, the retrieved unique registrant ID, and (iii) retrieving through the identity verification server, an identity data record corresponding to the retrieved unique registrant ID, and extracting from the retrieved identity data record, an entity name associated with said retrieved identity data record.

In a further method embodiment, the database configured to map payment card numbers with unique registrant IDs is located within either a payment network or an issuer network associated with the received payment card number.

The disclosure additionally provides a system for identity authentication in connection with payment account information submitted for the purpose of network based electronic payment transaction(s). The system comprises a trusted intermediary server configured to (i) receive from a merchant server, (a) a name associated with a purchaser identified for the purpose of the network based electronic payment transaction(s), and (b) a payment card number corresponding to a payment card presented for the purpose of implementing the network based electronic payment transaction(s), (ii) retrieve a data record comprising a payment card holder name associated with the received payment card number, (iii) compare the payment card holder name extracted from the retrieved data record with the name associated with the purchaser that has been received at the merchant server, and (iv) responsive to a match between the payment card holder name extracted from the retrieved data record with the name associated with the purchaser that has been received at the merchant server, generate a positive identity authentication decision and transmit said identity authentication decision to the merchant server.

The merchant server may be configured to respond to receiving the positive identity authentication decision from the trusted intermediary server by authorizing electronic payment transaction(s) based on the payment card number.

In a system embodiment, retrieving a data record comprising a payment card holder name associated with the received payment card number includes (i) identifying an issuer server associated with an issuer institution that has issued the payment card to which the received payment card number corresponds, (ii) transmitting to the identified issuer server, the received payment card number, and (iii) receiving from the identified issuer server, a data record comprising a name of the authorized holder of the payment card to which the received payment card number corresponds.

In a further system embodiment, retrieving a data record comprising a payment card holder name associated with the received payment card number includes (i) retrieving from a database configured to map payment card numbers with unique registrant IDs, a unique registrant ID associated with the received payment card number, wherein each unique registrant ID within the database correlates to a corresponding identity data record associated within an identity verification server, said corresponding identity data record including at least an entity name associated with said identity data record, (ii) transmitting to the identity verification server, the retrieved unique registrant ID, and (iii) retrieving through the identity verification server, an identity data record corresponding to the retrieved unique registrant ID, and extracting from the retrieved identity data record, an entity name associated with said retrieved identity data record.

In another system embodiment, the database configured to map payment card numbers with unique registrant IDs is located within either a payment network or an issuer network associated with the received payment card number.

The disclosure additionally provides computer program products for identity authentication in connection with payment account information submitted for the purpose of network based electronic payment transaction(s), comprising a non-transitory computer usable medium having computer readable program code embodied therein, the computer readable program code comprising instructions for implementing any of the method embodiments described in the disclosure herein.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
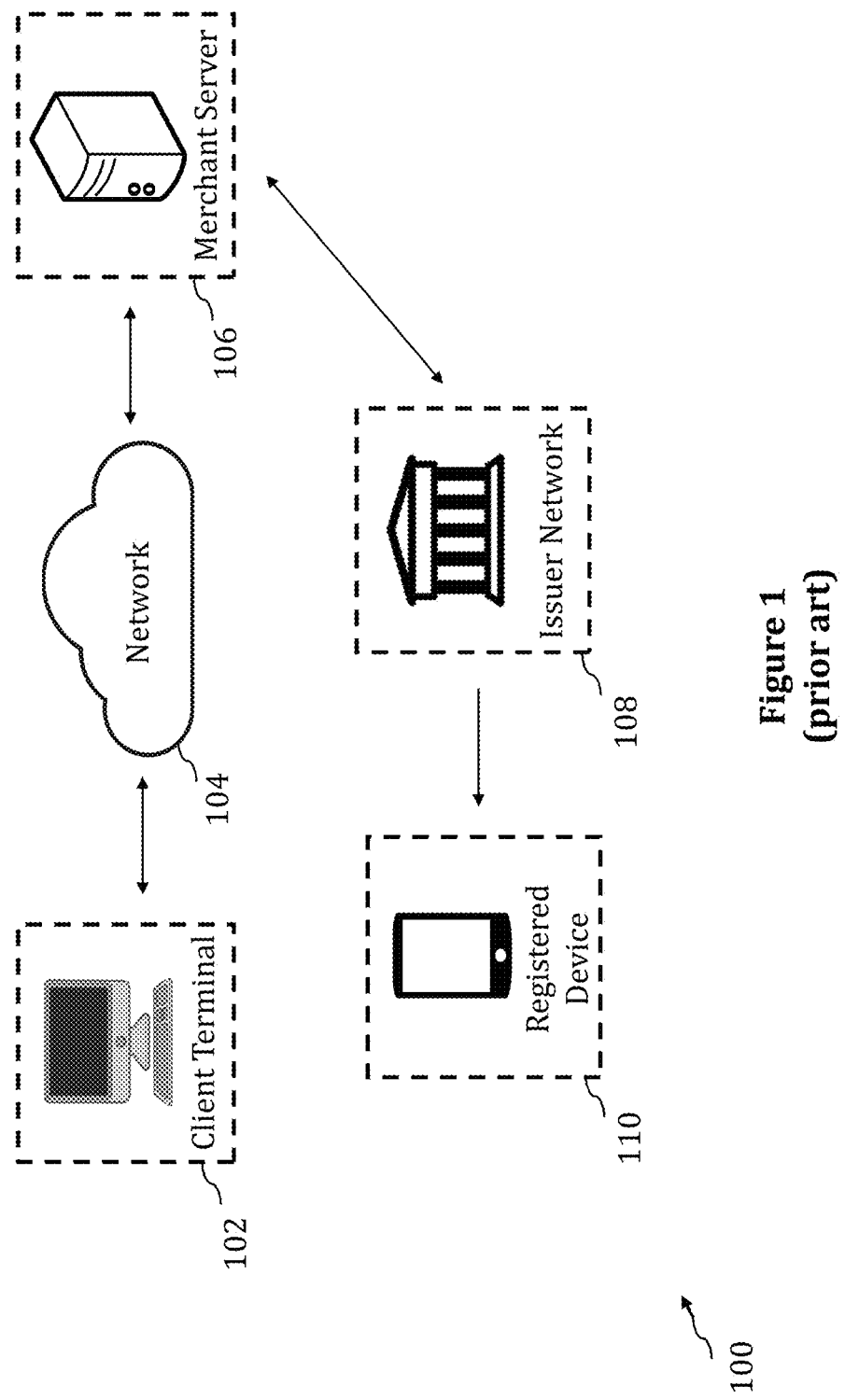
FIG. 1 illustrates a prior art system environment for authenticating and implementing electronic transactions through a payment card transaction system.

Embodiments will be described, by way of example only, with reference to the drawings. The description and specific examples included herein are intended for purposes of illustration only and are not intended to limit the scope of the present disclosure.

There present disclosure provides systems, methods and computer program products that enable convenient and secure multi-factor authentication of identity of an individual or entity that is seeking to use a payment card or payment account to effect an electronic payment transaction.

For the purposes of the present disclosure, the following terms shall be understood to have the corresponding meanings provided below:

"Acquirer" shall mean a business (e.g., a financial institution or a merchant bank) that contracts with a merchant to coordinate with the issuer network of a customers' payment card or payment account.

"Card holder", "Account Holder" or "Customer" shall mean an authorized user of a payment card or payment account who is making a purchase or effecting an electronic transaction with a payment card or payment account.

"Payment network" shall refer to the intermediary between the merchant's acquirer and the customer's issuer (for example, Mastercard® or Visa®). The payment network primarily coordinates payment card or payment account transactions between acquirers and issuers, and additionally coordinates clearing and settlement services to transfer payments from issuers to merchants.

"Issuer" shall mean a financial institution that issues payment cards or payment accounts and maintains a contract with a customer or card holder or account holder for repayment or settlement of purchases made on the payment card.

"Issuer network" shall refer to a communication network, including hardware, software and other equipment used by an issuer to transmit and process payment card transactions and information related to customers, payment cards and transactions.

"Merchant" shall mean an authorized acceptor of payment cards or of payment account information for the payment of goods or services sold by the merchant.

"Payment card" shall mean a card or data associated with a payment account that may be provided to a merchant in order to fund a financial transaction via the associated payment account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated payment account (e.g., as stored in a communication device, such as a smart phone or computer). For example, in some instances, data including a payment account number may be considered a payment card for the processing of a transaction funded by the associated payment account. In some instances, a check may be considered a payment card where applicable.

"Payment account" shall mean any account that may be used for the purposes of effecting an electronic payment or electronic transaction, and shall include any electronic transaction account, payment card account, bank account or electronic wallet account.

Figure 2:
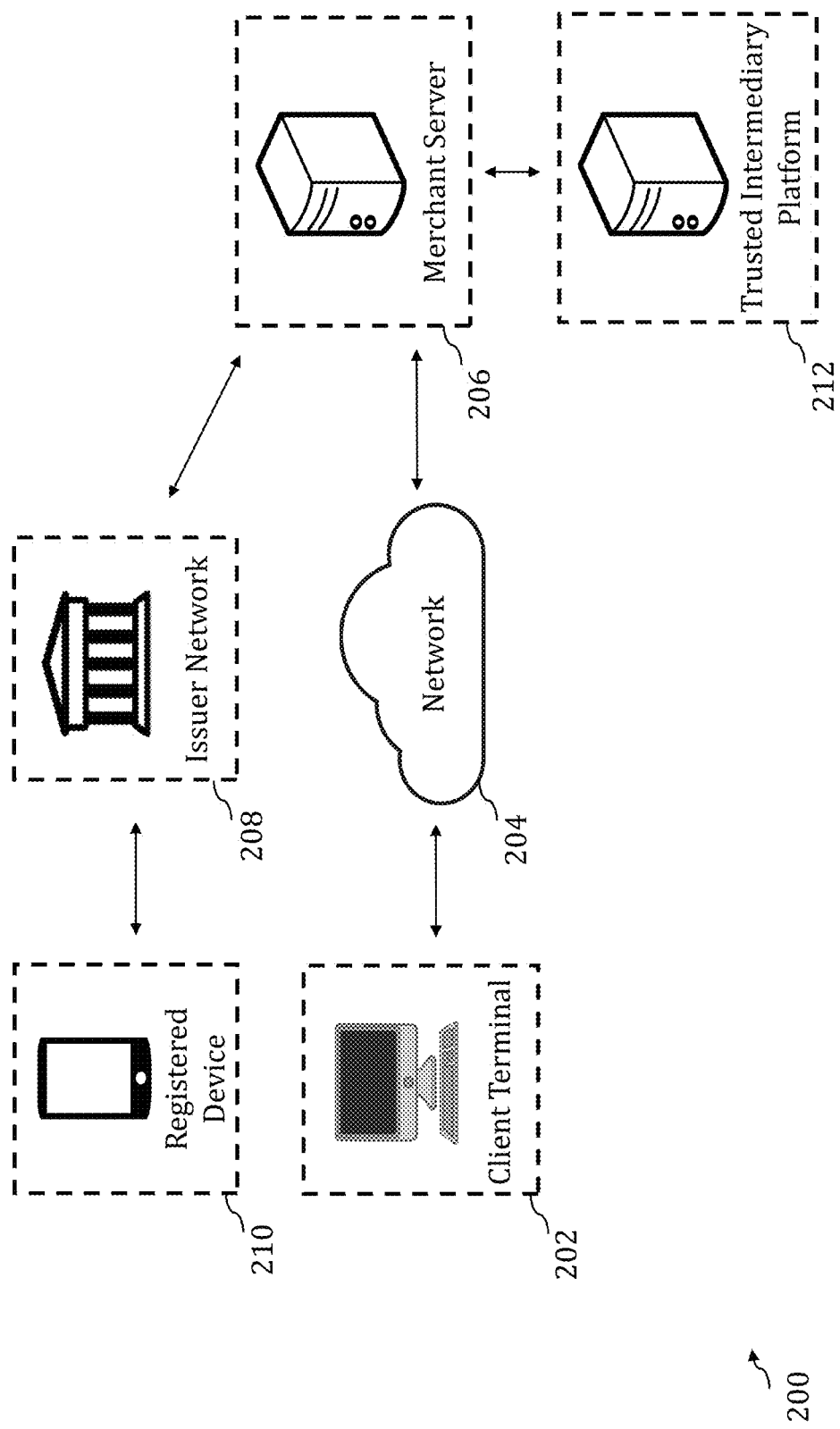
FIG. 2 illustrates a system environment that has been configured for authenticating and implementing electronic transactions through a payment card or payment account based transaction system in accordance with the present disclosure.

FIG. 2 illustrates a system environment 200 in accordance with the present disclosure that is configurable to implement methods of identity authentication. Client terminal 202 may comprise any network communication enabled data processing terminal through which a user accesses an online website, a software application or payment gateway through which payment is intended to be made to a merchant for products or services. Said client terminal 202 may be communicably coupled with merchant server 206 through communication network 204, and merchant server 206 may be configured to receive payor information from client terminal 202 for the purposes of initiating a payment from the payor's payment card or payment account to a merchant payment account.

As illustrated in FIG. 2, merchant server 206 may be communicably coupled with issuer network 208, and with trusted intermediary platform 212. Issuer network 208 may be configured for network based data communication with a registered device 210 (for example, a network communication enabled data processing device, such as a smartphone) that is associated with the authorized holder of a payment card or payment account associated with issuer network. Trusted intermediary platform 212 (as discussed in more detail below) may be configured to implement identity authentication process flows in accordance with the present disclosure. The operation of individual components within system environment 200 will be discussed in more detail in connection with method embodiments of the present disclosure.

Figure 3:
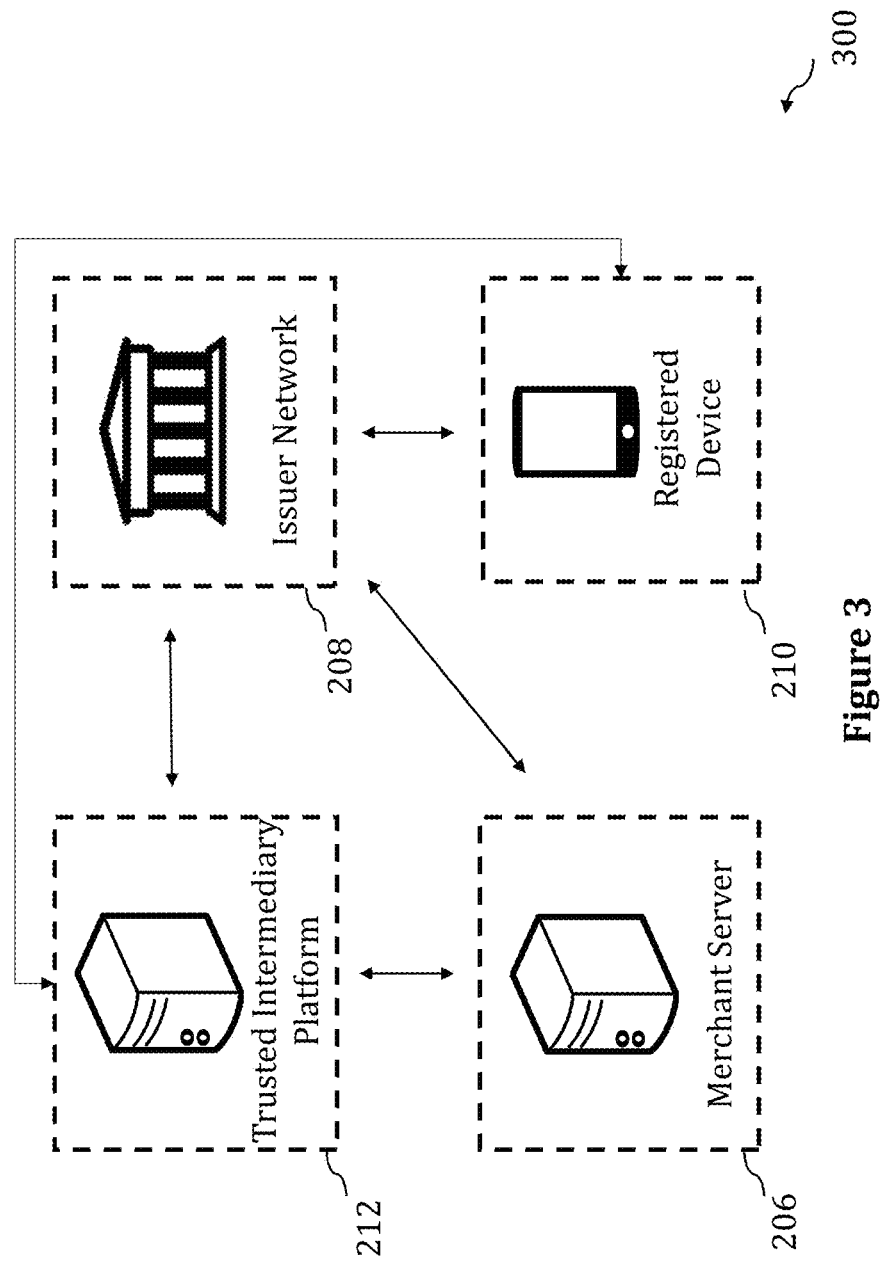
FIG. 3 illustrates interactions between components of a system environment that is configured for implementing a first embodiment of the disclosure.

FIG. 3 illustrates a specific configuration 300 of the components of system environment 200, namely, of merchant server 206, issuer network 208, registered device 210 and trusted intermediary platform 212. As shown in FIG. 3, (i) merchant server 206 may be communicably coupled with issuer network 208 and with trusted intermediary platform 212, (ii) trusted intermediary platform 212 may additionally be communicably coupled with issuer network 208 and with a registered device 210 associated with an authorized holder of a payment card or payment account, and (iii) issuer network 208 may be additionally communicably coupled with registered device 210. The manner in which the specific configuration 300 of components shown in FIG. 3 operates or functions is explained in detail in connection with method embodiments of the present disclosure.

Figure 4:
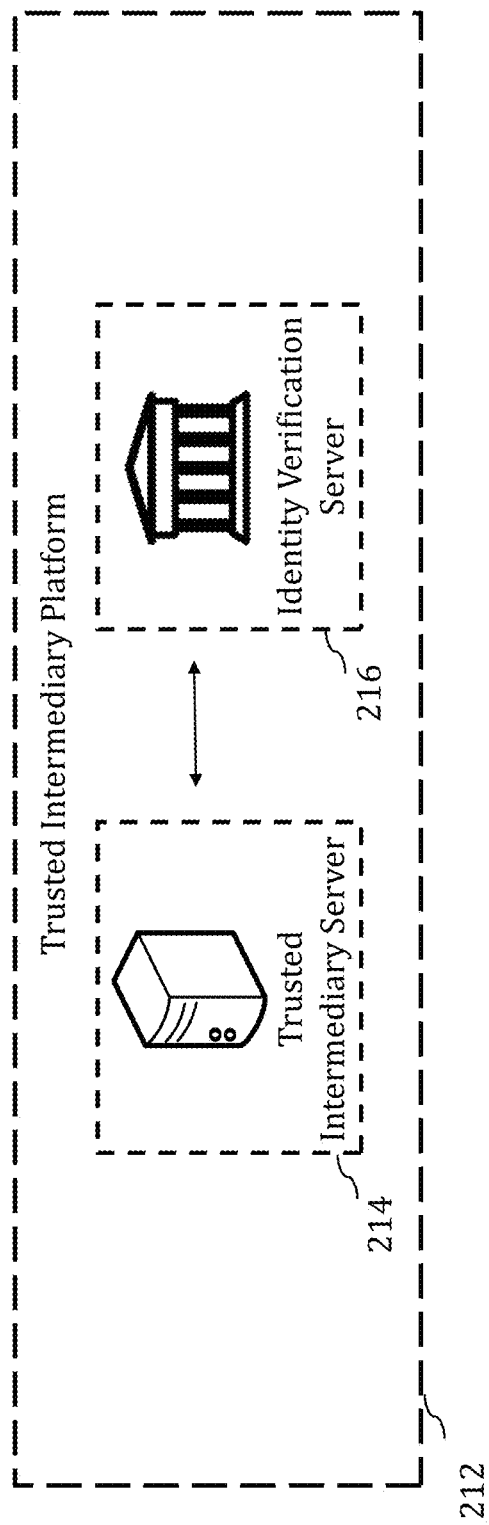
FIG. 4 illustrates a specific embodiment of a trusted intermediary platform.

FIG. 4 illustrates a specific embodiment of trusted intermediary platform 212, comprising a trusted intermediary server 214 communicably coupled with an identity verification server 216.

The trusted intermediary server 214 may comprise any server operated by a trusted third party, including, without limitation, a payment network associated with a payment account or a payment card, or any trusted third party intermediary company other than the payment network and the issuer. An embodiment of trusted intermediary server 214 is discussed in more detail in connection with FIG. 5.

Identity verification server 216 may comprise a server having access to one or more data records corresponding to individuals or entities registered for identity verification through operation of said identity verification server 216. Said data record(s) comprise (i) a unique registrant ID corresponding to each registrant (ii) one or more items of identity data corresponding to each such registrant and (iii) an association recorded between (i) and (ii). Subject to submission of a unique registrant ID corresponding to a registrant, identification verification server 216 may be configured to retrieve one or more items of identity data from within a data record associated with said unique registrant ID, which one or more items of identity data may be used for the purposes of identity verification in accordance with the teachings of the present disclosure.

In an embodiment of the disclosure, the unique registrant ID used by identification verification server 216 may comprise an identifier that is capable of uniquely identifying an individual. Exemplary non-limiting examples of identifiers that may be used as a unique registrant ID are an individual's passport number, social security number, aadhar number (i.e., a unique identity number allocated by the Unique Identification Authority of India (UIDAI), Government of India), voter ID number, ration card number, driver's license number, and permanent account number (PAN). In an embodiment of the disclosure, the identity verification server 216 is configured to associate each unique registrant ID that is maintained by said identity verification platform with at least a name of the corresponding individual/entity.

It would be understood that certain types of identifiers that may be used as a unique registrant ID may be "protected identifiers", i.e., identifiers that are statutorily regulated under applicable data privacy laws or other regulations that prohibit storage of said identifiers by any third party. An example of identifiers of this type would be aadhar numbers issued by the Government of India under the UIDAI project. In such situations, the unique identifier that is used as the unique registrant ID may comprise any other "alias identifier" that is unique to the concerned individual, and which has been associated with said individual's protected identifier in the appropriate government controlled database. In such situations, access to the individual's protected identifier and data records associated with such identifier may be made available through an interface gateway (for example, one or more APIs) to the database at which records associated with the protected identifier are maintained, which interface gateway enables records corresponding to the individual's protected identifier to be requested/retrieved from the appropriate database by forwarding said individual's alias identifier to said interface gateway with an appropriate request for data retrieval and/or identity verification. Continuing with the example where the protected identifier is an individual's aadhar number, such numbers are mandatorily associated in the UIDAI database with a mobile phone number associated with the registered individual. Accordingly, the individual's mobile number can in such cases serve as the alias identifier provided by the individual as her/his unique registrant ID—and which mobile number may be used to identify said individual's aadhar number and data records associated with said aadhar number by communicating an appropriate data message or API call to the interface API made available by the UIDAI for this purpose.

Figure 5:
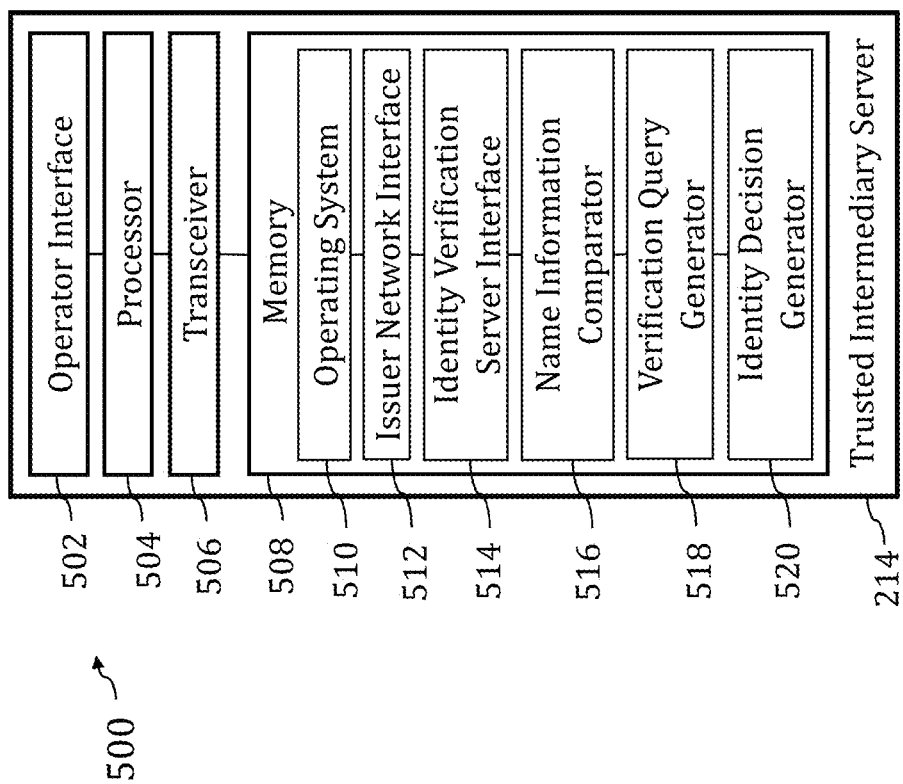
FIG. 5 illustrates an exemplary trusted intermediary server configured in accordance with the teachings of the present disclosure.

FIG. 5 illustrates a specific embodiment of trusted intermediary server 214 within trusted intermediary platform 212. Trusted intermediary server 214 may comprise any processor implemented server device or data processing device configured for network based communication. In specific embodiments, trusted intermediary server 214 may include operator interface 502, processor 504, communication transceiver 506 and memory 508, which memory 508 may include transitory memory and/or non-transitory memory. In an exemplary embodiment, memory 508 may have stored therewithin, (i) an operating system 510 configured for managing device hardware and software resources and that provides common services for software programs implemented within trusted intermediary server 500, (ii) an issuer network interface 512 configured to enable trusted intermediary server 500 to communicate and exchange data with an issuer network 208, (iii) an identity verification server interface 514 configured to enable the embodiment of trusted intermediary server 500 to communicate and exchange data with identity verification server 216, (iv) name information comparator 516 configured to compare name information received from a merchant server 206 with name information received from identity verification server 216, (v) verification query generator 518 configured to generate identity verification requests or queries for transmission to identity verification server 216, and (vi) identity decision generator 520 configured to generate an identification confirmation decision or an identification failure decision based on data received from identity verification server 216. The specific operation of components of trusted intermediary server 214 is discussed in more detail in connection with the methods described herein below.

Figure 6:
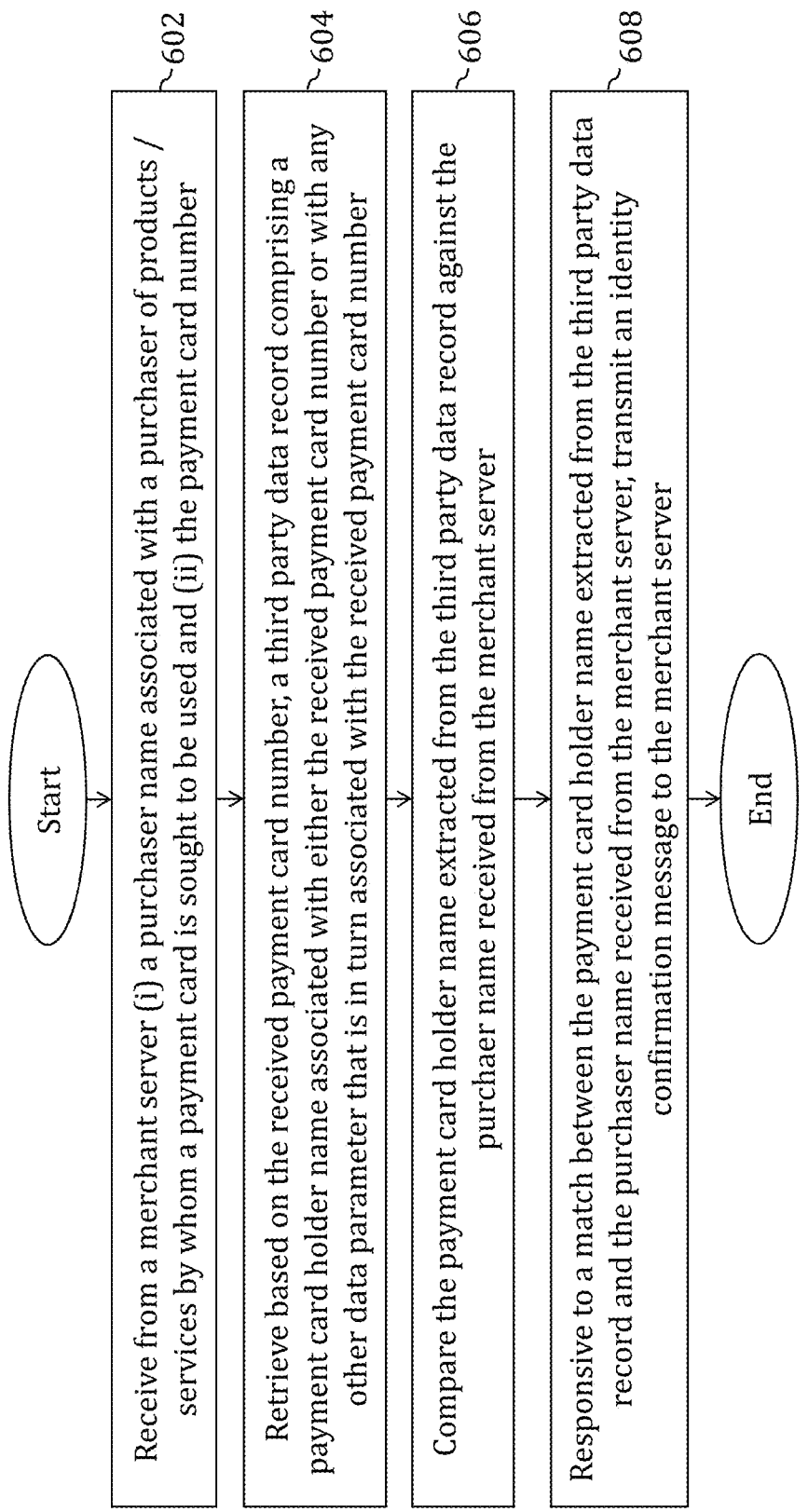
FIG. 6 illustrates a method of authentication of a payor identity in accordance with the present disclosure.

FIG. 6 illustrates a method of identity authentication of an individual/entity who presents information corresponding to a payment card or payment account intended to be used for effecting one or more online payment transactions or electronic payment transactions through a merchant server. In an embodiment of the disclosure said method may be implemented within a trusted intermediary server 214 of the type discussed in connection with FIG. 5.

Step 602 comprises receiving from a merchant server 206, (i) a purchaser name associated with a purchaser of products/services by whom a payment card or payment account is sought to be used for said purchase of products/services through merchant server 206, and (ii) a payment card number or payment account number presented by said purchaser. One or both of the purchaser name and the payment card number or payment account number may be transmitted to merchant server 206 from a client terminal 202 that is being operated by the purchaser. In an embodiment of the disclosure, said information may be input at client terminal 202 for onward transmission to merchant server 206 at the time of creation of an online purchase account associated with the purchaser at merchant server 206, or at the time of associating of a payment card or payment account with said online purchase account, or at the time of effecting electronic purchase of a product or service from merchant server 206 through client terminal 202.

Step 604 comprises retrieving from a trusted intermediary platform 212, a third party data record comprising a payment card holder name or a payment account holder name that has been previously associated with either the received payment card number or payment account number, or that is associated with any other data parameter that has in turn been associated with the received payment card/payment account number. Specific embodiments of the step of retrieving a payment card/payment account holder name at step 604 are described in more detail in connection with FIGS. 8 to 11 below.

In one such embodiment, step 604 may comprise querying and receiving from a payment network or issuer network associated with the received payment card or payment account number, a data record comprising at least the name of the authorized holder of the payment card or payment account received at step 602.

In another embodiment, step 604 may comprise (i) first querying and receiving from a payment network associated with the received payment card or payment account number, a data record comprising a unique registrant ID that is associated with the received payment card number or payment account number within the data records of the payment network, and which unique registrant ID uniquely identifies a corresponding data record associated with the authorized holder of the payment card or payment account in the records of identity verification server 216 and (ii) thereafter querying and receiving from identity verification server 216, a data record comprising an individual's/entity's name that is associated with the unique registrant ID that has been received from the payment network.

It would be understood that in various embodiments of the method of FIG. 6, a third party record comprising a payment card holder name or a payment account holder name that has been previously associated with either the received payment card number or payment account number, or that is associated with any other data parameter that has in turn been associated with the received payment card/payment number, may be received at trusted intermediary server 214 through identity verification platform interface 514 in response to a query for relevant third party data records that has been generated and transmitted by verification query generator 518.

At step 606, a payment card holder name or payment account holder name that is extracted from the third party data record received at step 604 is compared against the purchaser name received at step 602 from merchant server 206. In an embodiment of the disclosure, step 606 may be implemented through name information comparator 516 within trusted intermediary server 214.

At step 606, responsive to a match between (i) the payment card holder name or payment account holder name that is extracted from the third party data record received at step 604 and (ii) the purchaser name received at step 602 from merchant server 206—an identity confirmation/positive identity authentication decision is generated and an identity confirmation message is transmitted by trusted intermediary server 214 to merchant server 206 (for example, at step 608).

In an embodiment, said identity confirmation/positive identity authentication decision may be generated by identity decision generator 520 within trusted intermediary server 214. It would be understood that upon receipt of said identity confirmation message from trusted intermediary server 214, merchant server 206 may treat, as verified, the identity of the individual or entity that has presented the payment card or payment account (for the purpose of purchase) through merchant server 206. It would additionally be understood that merchant server 206 may use the method of FIG. 6 as the sole method of identity authentication, or as one of multiple tiered methods of identity authentication.

In an embodiment of the method of FIG. 6, responsive to receiving an identity confirmation/positive identity authentication decision within an identity confirmation message that is transmitted by trusted intermediary server 214 to merchant server 206, said merchant server 206 may authorize and proceed with the process work flow that has been requested by the client terminal 202 and for which process work flow the identity of the entity or individual initiating the request requires to be authenticated. In various embodiments, said process work flow may involve any one or more of creation of an online purchase account associated with the purchaser at merchant server 206, or associating of a payment card or payment account with said online purchase account, or effecting of an electronic purchase of a product or service from merchant server 206 through client terminal 202, or otherwise authorizing use of the payment card or payment account by the purchaser in connection with electronic payment transactions through merchant server 206.

In a further embodiment of the method of FIG. 6, responsive to receiving an identity authentication refusal/negative identity authentication decision within an identity confirmation message that is transmitted by trusted intermediary server 214 to merchant server 206, said merchant server 206 may reject or terminate a process work flow that has been requested by the client terminal 202 and for which process work flow the identity of the entity or individual initiating the request requires to be authenticated. In various embodiments, said process work flow may involve any one or more of creation of an online purchase account associated with the purchaser at merchant server 206, or associating of a payment card or payment account with said online purchase account, or effecting of an electronic purchase of a product or service from merchant server 206 through client terminal 202.

Figure 7:
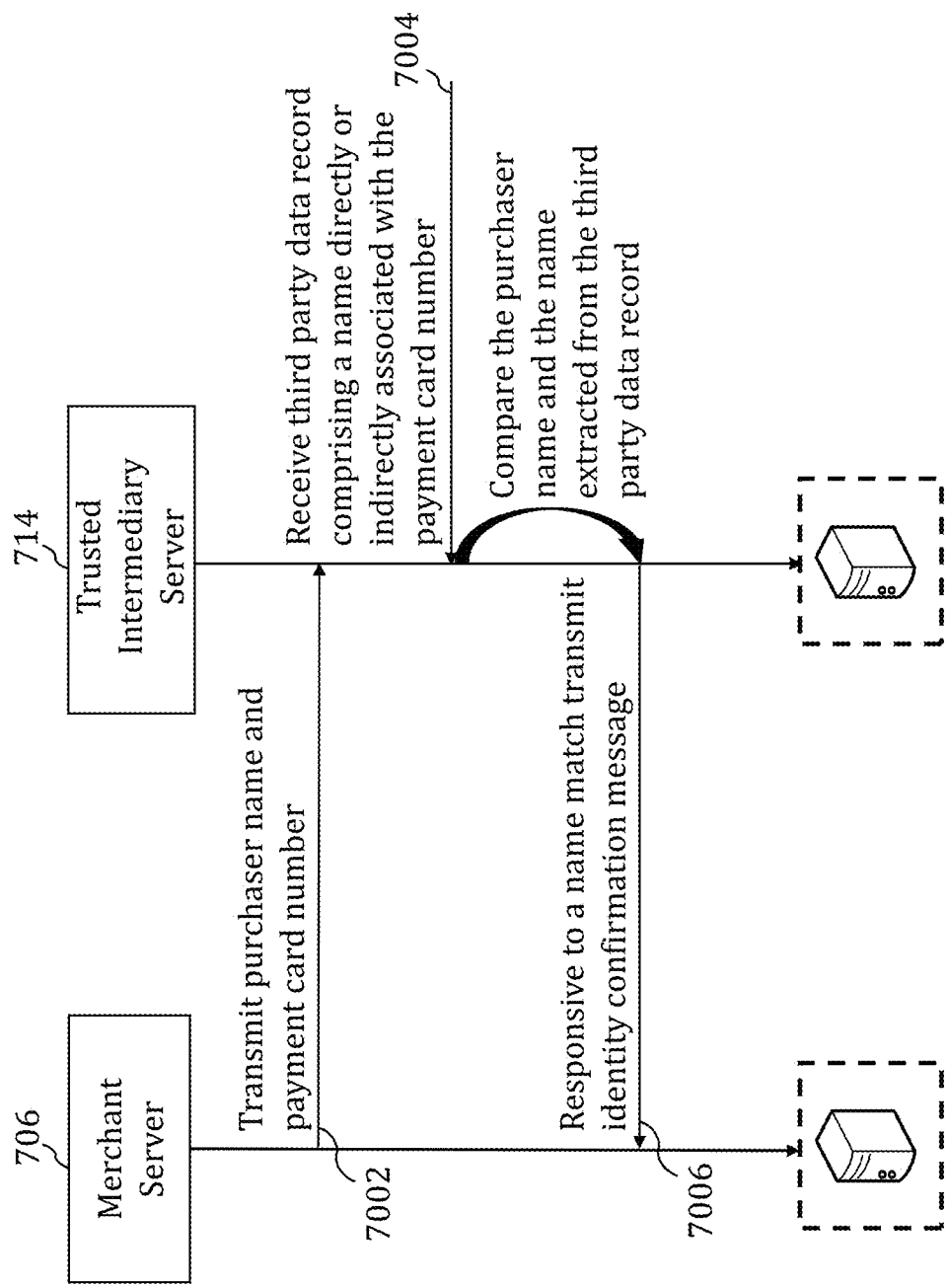
FIG. 7 is a communication flow diagram illustrating communication flow between system entities involved in the method of FIG. 6.

FIG. 7 is a communication flow diagram illustrating communication flow between system entities involved in the method of FIG. 6.

At step 7002 merchant server 706 transmits to trusted intermediary server 714, (i) a purchaser name associated with a purchaser of products/services by whom a payment card or payment account is sought to be used through merchant server 706, and (ii) a payment card number or payment account number presented by said purchaser.

At step 7004, trusted intermediary server 714 receives (in accordance with method step 604) a third party data record comprising a payment card holder name or a payment account holder name directly or indirectly associated with the payment card number or payment account number received at step 7002.

Trusted intermediary server 714 compares the received purchaser name associated (received at step 602 of FIG. 6) with the name extracted from the third party data record received at step 7004.

At step 7006, responsive to determination of a match (between the name received at step 602 of FIG. 6 and the name extracted from the third party data record received at step 7004) an identity confirmation message may be transmitted from trusted intermediary server 714 to merchant server 706.

Figure 8:
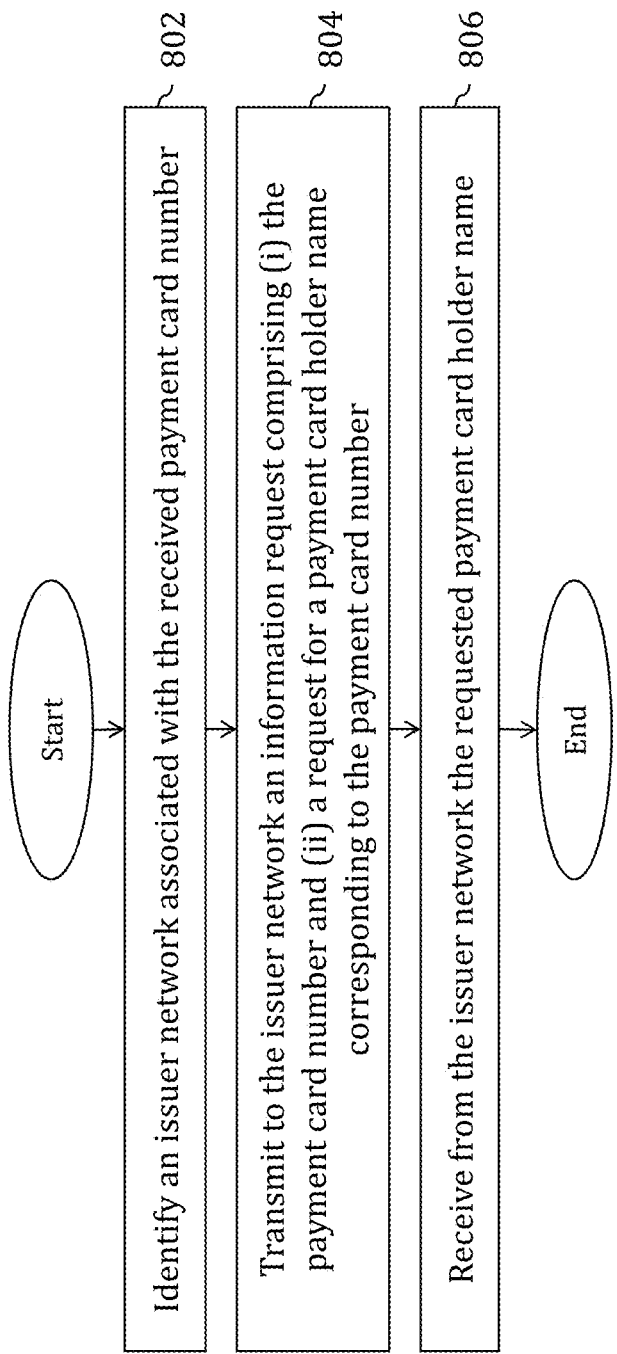
FIG. 8 illustrates a first embodiment of the step of retrieving from a third party data record, a name associated with a purchaser of products/services by whom a payment card is sought to be used, in accordance with the method of FIG. 6.

FIG. 8 illustrates a first embodiment of the step of retrieving from a third party data record, a name associated with a purchaser of products/services by whom a payment card or payment account is sought to be used, in accordance with step 604 of the method of FIG. 6.

In this embodiment, trusted intermediary server 214 is a server within a payment network associated with the received payment card or payment account number, and is capable of retrieving or receiving data from a plurality of data records that respectively correlate with each payment card or payment account associated with the payment network, a corresponding name of the authorized holder of said the payment card or payment account. Accordingly, for the purposes of implementing method step 604 of FIG. 6, the method of FIG. 8 commences at step 802 by identifying an issuer network 208 that is associated with the payment card number or payment account number that has been received at step 602 of FIG. 6.

Step 804 thereafter comprises transmitting to the identified issuer network 208, an information request comprising (i) the received payment card number or payment account number and (ii) a request for a name of an authorized holder of a payment card/payment account associated with the received payment card number or payment account number.

Step 806 comprises receiving from the issuer network 208, the requested name of the authorized holder of a payment card or payment account associated with the received payment card number or payment account number, which name may thereafter be used for the comparison described in step 606 of FIG. 6.

Figure 9:
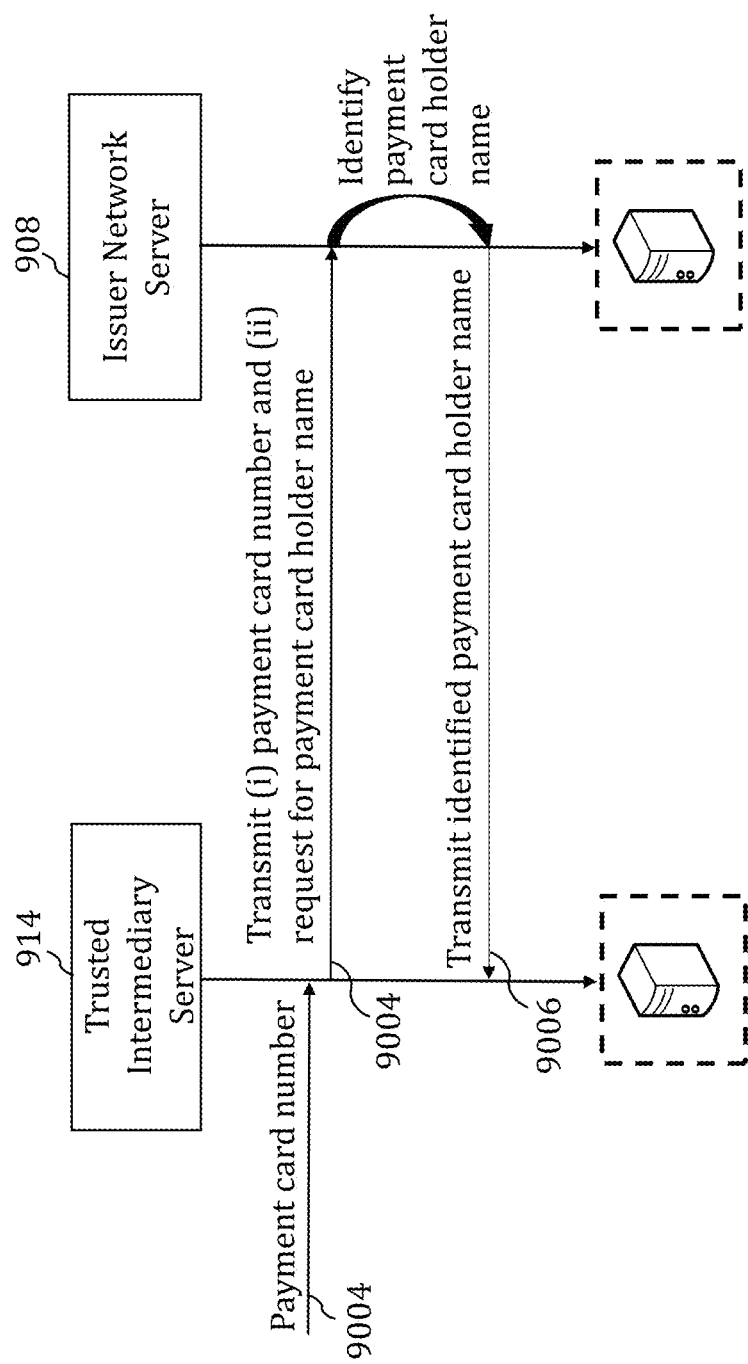
FIG. 9 is a communication flow diagram illustrating communication flow between system entities involved in the method of FIG. 8.

FIG. 9 is a communication flow diagram illustrating communication flow between system entities involved in the method of FIG. 8.

Step 9004 comprises receiving at trusted intermediary server 914, a payment card number or payment account number that has been received at step 602 of FIG. 6.

At step 9004, trusted intermediary server 914 transmits the received payment card number or payment account number and a request for the name of the authorized holder of the corresponding payment card or payment account to an issuer network server 908 (which issuer network server 908 may have been identified based on the received payment card number or payment account number). Issuer server 908 responds to the received request by identifying a name of the authorized holder of the payment card or payment account based on the received payment card number or payment account number.

At step 9006 the name of the identified authorized holder of the payment card or payment number is transmitted from issuer network server 908 to trusted intermediary server 914, where after the method of FIG. 6 proceeds to step 606 and onward.

Figure 10:
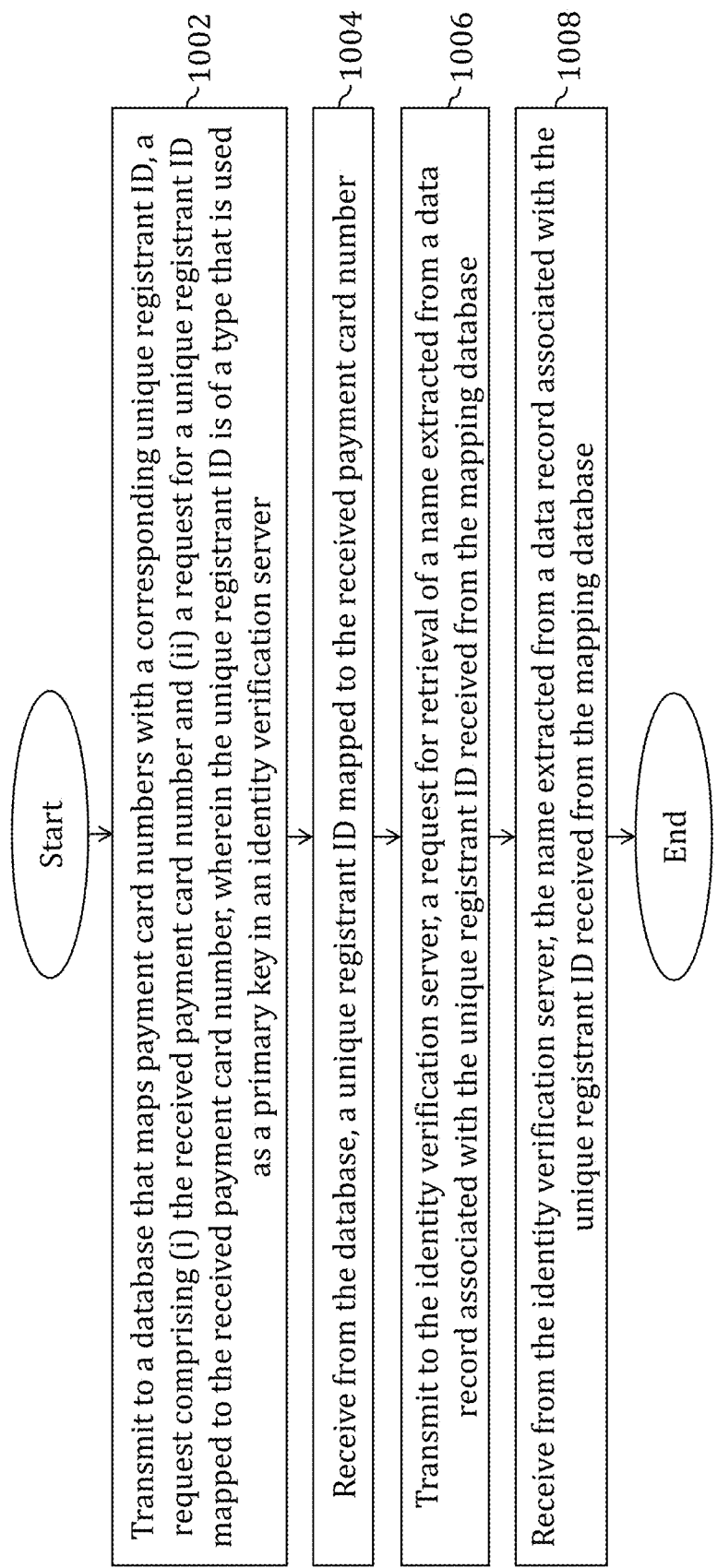
FIG. 10 illustrates a second embodiment of the step of retrieving from a third party data record, a name associated with a purchaser of products/services by whom a payment card is sought to be used, in accordance with the method of FIG. 6.

FIG. 10 illustrates a second embodiment of the step of retrieving from a third party data record, a name associated with a purchaser of products/services by whom a payment card or payment account is sought to be used, in accordance with step 604 of the method of FIG. 6.

In this second embodiment, trusted intermediary server 214 is communicably coupled with a server within a payment network associated with the received payment card number or payment account number, and is configured to retrieve data from a database that respectively correlates with one or more payment cards or payment accounts, a corresponding unique registrant ID corresponding to a data record stored or accessible by identity verification server 216 of FIG. 4. Trusted intermediary server 214 accordingly transmits to said database, at step 1002, a request comprising (i) the received payment card number or payment account number and (ii) a request for a unique registrant ID that is mapped to the received payment card number or payment account number, wherein the unique registrant ID is of a type that is used as a primary key (or other access key) for data retrieval of records associated with identity verification server 216.

Step 1004 comprises receiving from said database, a unique registrant ID mapped to the received payment card number or payment account number.

Step 1006 comprises transmitting to the identity verification server 216, a request for retrieval of a name that is associated in the records of said identity verification server 216, with the unique registrant ID received from the database, at step 1004.

Step 1008 thereafter comprises receiving from the identity verification server 216, a name that has been extracted from a data record associated with the received unique registrant ID, which name may thereafter be used for the subsequent name comparison step 606 of FIG. 6.

Figure 11:
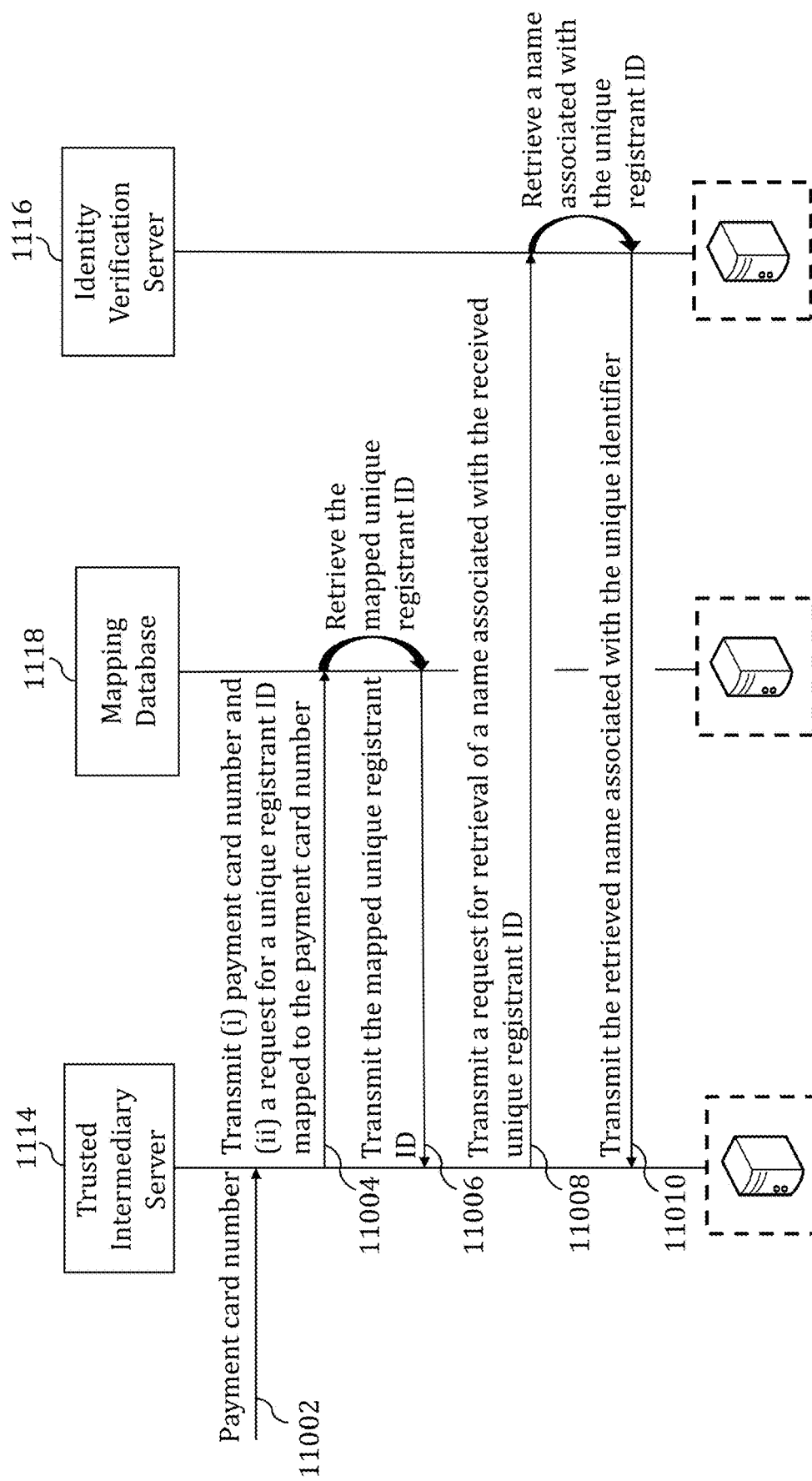
FIG. 11 is a communication flow diagram illustrating communication flow between system entities involved in the method of FIG. 10.

FIG. 11 is a communication flow diagram illustrating communication flow between system entities involved in the method of FIG. 10.

Step 11002 comprises receiving at trusted intermediary server 1114, a payment card number or payment account number that has been received at step 602 of FIG. 6.

At step 11004, trusted intermediary server 1114 transmits the received payment card number or payment account number and a request for a unique registrant ID mapped to the payment card number or payment account number to a mapping database 1118, wherein (i) the unique registrant ID is of a type that is used as a primary key (or any other access key) for data retrieval in identity verification server 1116 and (ii) mapping database 1118 is configured to store data records that respectively correlate with one or more payment cards or payment accounts, a corresponding unique registrant ID corresponding to a data record stored or accessible by identity verification server 1116.

Mapping database 1118 retrieves from its data records, the unique registrant ID that is mapped to the received payment card number or payment account number, and at step 11006 transmits the mapped unique registrant ID to trusted intermediary server 1114.

Step 11008 comprises transmitting from trusted intermediary server 1114 to identity verification server 1116, a request for retrieval of a name associated with the received unique registrant ID from the records of the identity verification server 1116.

Identity verification server 1116 thereafter retrieves from its data records, a name associated with the received unique registrant ID, and at step 11010, the retrieved name is transmitted back to trusted intermediary server 1114 by identity verification server 1116. The name transmitted at step 11010 may thereafter be used for the subsequent name comparison step 606 of FIG. 6.

While not expressly shown in FIG. 6 or any of FIGS. 8 to 11, it would be understood that in addition to the identity authentication steps of FIG. 6, the disclosure also contemplates other additional authentication steps to ensure that the individual or entity that is seeking to use or enroll a payment card or payment account for the purpose of purchase(s) through merchant server 206 is in fact the authorized holder of said payment card or payment account.

In one embodiment, said additional authentication may include retrieval (from records of an identity verification server 216) of an identifier corresponding to a registered device 210 that has been associated with a unique registrant ID associated with the received payment card number or payment account number (as identified and retrieved in accordance with the method of FIG. 10). Thereafter, an OTP may be generated and forwarded to the identified registered device, for input through client terminal 202 and onward transmission to identification verification platform 212 for the purposes of second factor identity authentication.

The disclosure additionally provides computer program products for identity authentication in connection with payment account information submitted for the purpose of network based electronic payment transaction(s), comprising a non-transitory computer usable medium having computer readable program code embodied therein, the computer readable program code comprising instructions for implementing any of the method embodiments described in the disclosure herein.

Figure 12:
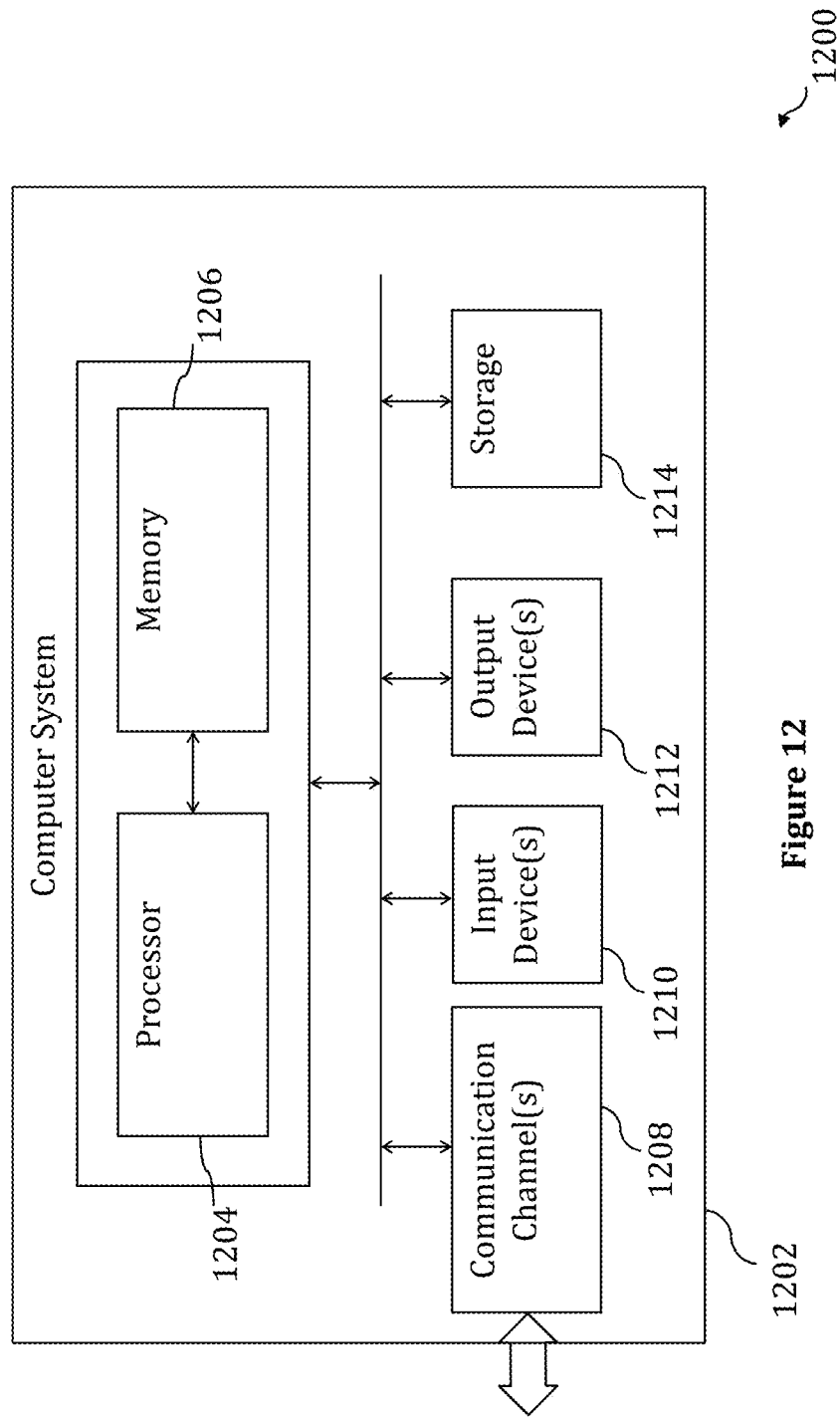
FIG. 12 illustrates an exemplary computer system according to which various embodiments of the present disclosure may be implemented.

FIG. 12 illustrates an exemplary system 1200 for implementing the present disclosure.

System 1200 includes computer system 1202 which in turn comprises one or more processors 1204 and at least one memory 1206. Processor 1204 is configured to execute program instructions, and may be a real processor or a virtual processor. It will be understood that computer system 1202 does not suggest any limitation as to scope of use or functionality of described embodiments. The computer system 1202 may include, but is not be limited to, one or more of a general-purpose computer, a programmed microprocessor, a micro-controller, an integrated circuit, and other devices or arrangements of devices that are capable of implementing the steps that constitute the method of the present disclosure. Exemplary embodiments of a computer system 1202 in accordance with the present disclosure may include one or more servers, desktops, laptops, tablets, smart phones, mobile phones, mobile communication devices, tablets, phablets and personal digital assistants. In an embodiment of the present disclosure, the memory 1206 may store software for implementing various embodiments of the present disclosure. The computer system 1202 may have additional components. For example, the computer system 1202 may include one or more communication channels 1208, one or more input devices 1210, one or more output devices 1212, and storage 1214. An interconnection mechanism (not shown) such as a bus, controller, or network, interconnects the components of the computer system 1202. In various embodiments of the present disclosure, operating system software (not shown) provides an operating environment for various softwares executing in the computer system 1202 using a processor 1204, and manages different functionalities of the components of the computer system 1202.

The communication channel(s) 1208 allow communication over a communication medium to various other computing entities. The communication medium provides information, such as program instructions, or other data in a communication media. The communication media includes, but is not limited to, wired or wireless methodologies implemented with an electrical, optical, RF, infrared, acoustic, microwave, Bluetooth, or other transmission media.

The input device(s) 1210 may include, but is not limited to, a touch screen, a keyboard, mouse, pen, joystick, trackball, a voice device, a scanning device, or any another device that is capable of providing input to the computer system 1202. In an embodiment of the present disclosure, the input device(s) 1210 may be a sound card, or similar device, that accepts audio input in analog or digital form. The output device(s) 1212 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 1202.

The storage 1214 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1202. In various embodiments of the present disclosure, the storage 1214 may contain program instructions for implementing any of the described embodiments.

In an embodiment of the present disclosure, the computer system 1202 is part of a distributed network or a part of a set of available cloud resources.

The present disclosure may be implemented in numerous ways including as a system, a method, or a computer program product, such as a computer readable storage medium or a computer network, wherein programming instructions are communicated from a remote location.

The present disclosure may suitably be embodied as a computer program product for use with the computer system 1202. The method described herein is typically implemented as a computer program product, comprising a set of program instructions that is executed by the computer system 1202, or any other similar device. The set of program instructions may be a series of computer readable codes stored on a tangible medium, such as a computer readable storage medium (storage 1214), for example, diskette, CD-ROM, ROM, flash drives or hard disk, or transmittable to the computer system 1202, via a modem or other interface device, over either a tangible medium, including, but not limited to, optical or analogue communications channel(s) 1208. The implementation of the disclosure as a computer program product may be in an intangible form using wireless techniques, including, but not limited to, microwave, infrared, Bluetooth or other transmission techniques. These instructions can be preloaded into a system or recorded on a storage medium, such as a CD-ROM, or made available for downloading over a network such as the Internet or a mobile telephone network. The series of computer readable instructions may embody all or part of the functionality previously described herein.

Based on the above, it would be apparent that the present disclosure offers significant advantages, in particular, by offering convenient and secure ways for authentication of an identity of an individual/entity that is seeking to use a payment card or payment account for implementing payment transactions through a merchant server.

While the exemplary embodiments of the present disclosure are described and illustrated herein, it will be appreciated that they are merely illustrative. It will be understood by those skilled in the art that various modifications in form and detail may be made therein without departing from or offending the spirit and scope of the disclosure as defined by the appended claims. Additionally, the disclosure illustratively disclose herein suitably may be practiced in the absence of any element which is not specifically disclosed herein, and in a particular embodiment that is specifically contemplated, the disclosure is intended to be practiced in the absence of any one or more element which are not specifically disclosed herein.

With that said, and as described, it should be appreciated that one or more aspects of the present disclosure transform a general-purpose computing device into a special-purpose computing device (or computer) when configured to perform the functions, methods, and/or processes described herein. In connection therewith, in various embodiments, computerexecutable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, and as described, the terminology used herein is for the purpose of describing particular exemplary embodiments only and is not intended to be limiting. As used herein, the singular forms "a," "an," and "the" may be intended to include the plural forms as well, unless the context clearly indicates otherwise. And, again, the terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the term "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

It is also noted that none of the elements recited in the claims herein are intended to be a means-plus-function element within the meaning of 35 U.S.C. § 112(f) unless an element is expressly recited using the phrase "means for," or in the case of a method claim using the phrases "operation for" or "step for."

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for authenticating an identity of a purchaser in connection with submission of payment account information by the purchaser for the purpose of a network based electronic payment transaction, the method comprising:

receiving, at a trusted intermediary server, from a merchant server, (i) a name associated with a purchaser identified for the purpose of a network based electronic payment transaction, and (ii) a payment card number corresponding to a payment card presented by the purchaser to a client terminal of a merchant associated with the merchant server for the purpose of the network based electronic payment transaction, wherein the trusted intermediary server is separate from a payment network;

retrieving, by the trusted intermediary server, from a database located within an issuer network associated with the received payment card number, a unique registrant ID associated with the received payment card number, wherein the unique registrant ID correlates to an identity data record in an identity verification server, wherein the unique registrant ID is specific to an individual associated with the received payment card number;

transmitting, by the trusted intermediary server, the unique registrant ID to the identity verification server;

in response to transmitting the unique registrant ID to the identity verification server, receiving, by the trusted intermediary server, from the identity verification server, the identity data record, the identity data record including a payment card holder name of the individual;

extracting, by the trusted intermediary server, the payment card holder name from said identity data record;

comparing, by the trusted intermediary server, the payment card holder name extracted from the retrieved identity data record with the name associated with the purchaser received from the merchant server; and responsive to a match between the payment card holder name extracted from the retrieved identity data record and the name associated with the purchaser received from the merchant server, generating, by the trusted intermediary server, a positive identity authentication decision and transmitting said positive identity authentication decision to the merchant server.

2. The method as claimed in claim 1, wherein the merchant server is configured to respond to receiving the positive identity authentication decision from the trusted intermediary server by authorizing the electronic payment transaction based on the payment card number.

3. A system for authenticating an identity of a purchaser in connection with submission of payment account information by the purchaser for the purpose of a network based electronic payment transaction, the system comprising:

a trusted intermediary server having at least one processor configured to:

receive, from a merchant server, (i) a name associated with a purchaser identified for the purpose of a network based electronic payment transaction, and (ii) a payment card number corresponding to a payment card presented by the purchaser to a client terminal of a merchant associated with the merchant server for the purpose of the network based electronic payment transaction, wherein the trusted intermediary server is separate from a payment network;

retrieve, from a database, a unique registrant ID associated with the received payment card number, wherein the unique registrant ID correlates to an identity data record at an identity verification server, wherein the unique registrant ID is specific to an individual associated with the received payment card number;

transmit the unique registrant ID to the identity verification server;

responsive to the transmittal of the unique registrant ID to the identity verification server, receive, from the identity verification server, the identity data record based on the unique registrant ID, the identity data record including a payment card holder name of the individual;

compare the payment card holder name from the retrieved identity data record with the name associated with the purchaser received from the merchant server; and responsive to a match between the payment card holder name from the retrieved identity data record and the name associated with the purchaser received from the merchant server, generate a positive identity authentication decision and transmit said positive identity authentication decision to the merchant server.

4. The system as claimed in claim 3, wherein the merchant server is configured to respond to receiving the positive identity authentication decision from the trusted intermediary server by authorizing the electronic payment transaction based on the payment card number.

5. The system as claimed in claim 3, wherein the trusted intermediary server is further configured extract, from the identity data record, the payment card holder name prior to comparing the payment card holder name to the name associated with the purchaser received from the merchant server.

6. The system as claimed in claim 5, wherein the database is located within either the payment network or an issuer network associated with the received payment card number.

* * * * *